April 24, 1951 — F. E. REEFE — 2,549,928
ILLUMINATED PICTURE FRAME
Filed July 30, 1946
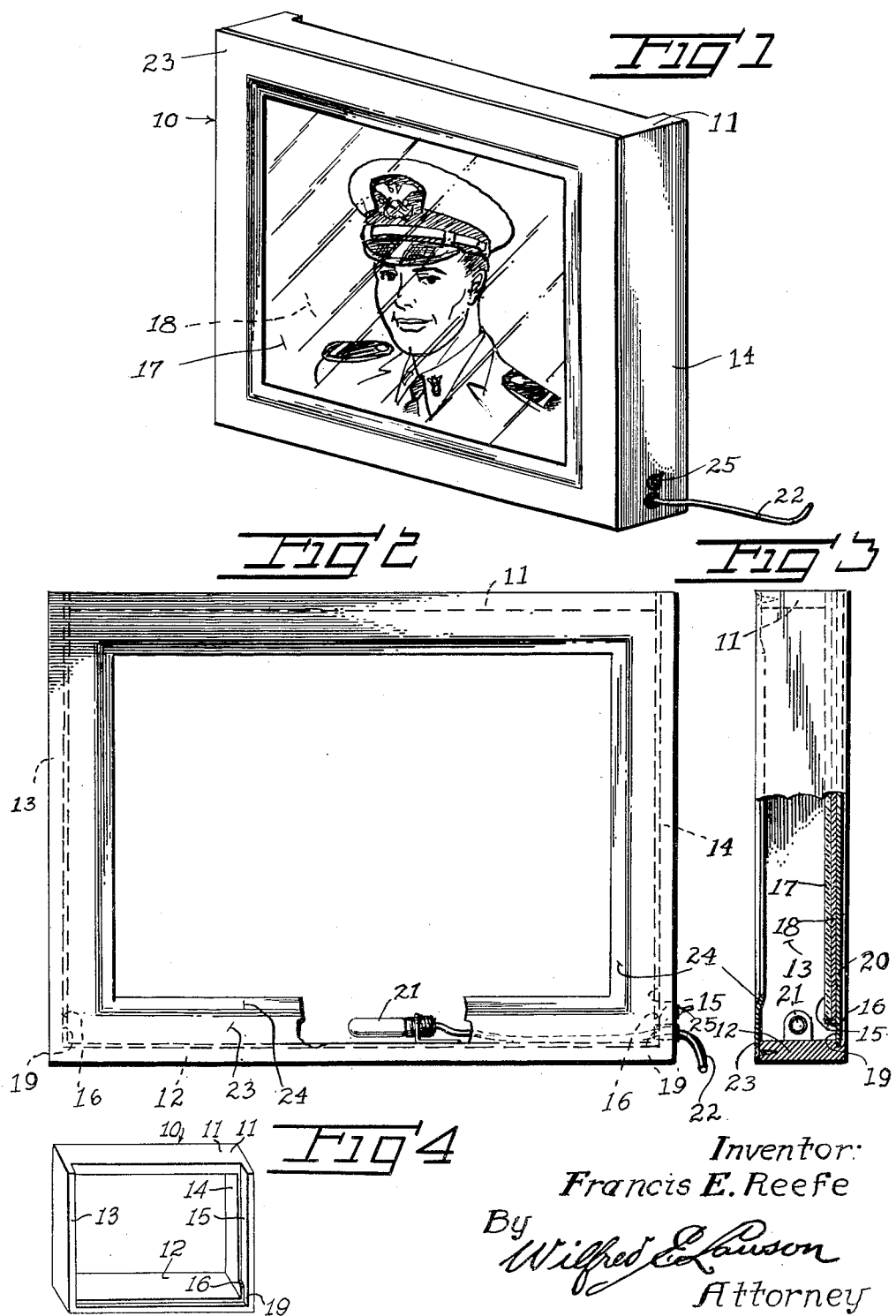
Inventor:
Francis E. Reefe
By Wilfred E. Lawson
Attorney Patented Apr. 24, 1951

2,549,928

UNITED STATES PATENT OFFICE 2,549,928

ILLUMINATED PICTURE FRAME

Francis E. Reefe, Chicago, Ill.

Application July 30, 1946, Serial No. 687,078

1 Claim. (Cl. 40—152.2)

My invention relates to frames for pictures, whether painted or printed, and for valuable certificates, documents on cloth, parchment, paper or flat sheets of any kind of work of art that can be framed, plaques with or without ornamentation and the like.

The frame is so designed and constructed that it will throw a light over the entire surface of the article framed without giving out any light to other objects that may be disposed outside of the frame.

In order to intensify the light on the framed article, the interior of the frame is provided with light reflecting surfaces. The surface may therefore be polished, painted or varnished to provide a more or less glossy surface or made of such material that in itself has reflecting properties.

The material used for the frame may be metal, plastic or wood, "papier-mâché," plaster of Paris, and so forth.

One embodiment of the invention is shown in the accompanying drawing wherein—

Figure 1 is a perspective front view of the frame with the picture in place.

Figure 2 is a face view of the frame alone; and

Figure 3 is an end and part vertical section of Figure 2.

Figure 4 is a rear perspective view of the frame with the front and rear parts removed.

Like numerals denote the same details in the different views of the drawing and the frame in general is designated 10.

As best seen in Figure 2, the frame is made up of four pieces of ordinary frame material, so that a rectangular frame, as here shown, is composed of two long flat top and bottom bar members 11 and 12 respectively, and two side flat side bar members 13 and 14 all of rectangular cross section and joined together at the corners. In each of the side members 13, 14 along their inner faces is cut a vertical groove 15 down to a seat or ledge 16 for seating a glass 17 and behind it a picture 18, while a rear groove 19 runs all the way down to the bottom member 12 and in this groove 19 is deposited a board or backing 20, which thus covers the rear opening of the frame 10.

The front side of the frame has a metal shield 23 having the outside dimensions of the frame 10 and beveled or inwardly bent edges 24 forming an inner window, thru which the picture is visible. This shield 23 thus takes the place of a molding which, however, is spaced some distance from the picture.

In the wide space between the picture 18 and the front shield 23 is inserted one or more light bulbs 21 either electric, mercury, neon or any other suitable lights. From an outside source current is supplied to the bulb by a cable 22, running out sideways from the frame and provided with a switch 25. The bevels 24 are high or wide enough to conceal the bulb from the outside.

All the interior surfaces of the frame, that is, the inner sides of bevels 24 and walls 11, 12, 13 and 14 are treated to reflect light from the bulb 21 and throw it back against the picture. Such reflection may be obtained from white paint, polish or varnish on the surface or from the material the frame is made of if metal or plastic.

It is stipulated that the frame may be given other shapes than rectangular or square, such as oval, round or any other contour, or with curved or ornamented front. It may be made to hang on a wall or stand on a table or pedestal.

Besides for pictures in ordinary sense, paintings, photographs, prints, etc., the frames can also be utilized in churches for crosses, saints, images and so forth, and the term picture in the claim is accordingly intended to cover other articles as herein mentioned for framing.

It is to be understood that the invention as herein disclosed may be varied from the details described and shown without departure from the spirit of the subjoined claim.

I claim:

An illuminated picture frame, comprising top, side and bottom walls of a substantial width, said side and bottom walls having aligned grooves extending parallel to and adjacent the rear edges thereof, said grooves in said side walls being of an increased width in the forward direction and upwardly from relatively short distances above said bottom wall, said bottom wall having the groove therein of a width equal to that of the lower end portions of the grooves in said side walls, said top wall having a slot therein aligned with the said grooves and of a width equal to the upper portions of the grooves in said side walls for the insertion downwardly therethrough of a transparency and a picture in rear of the latter, a back wall insertible downwardly through said slot in rear of said picture, the lower edges of said transparency and said picture seating on the bottom of the wider portions of the grooves in said side walls and the like edge of said back wall in the groove in said bottom wall, an open rectangular frame secured on the front edges of said top, side and bottom walls, and an electric lamp supported on said bottom wall medially between the ends thereof and in rear of the bottom portion of the last named frame.

FRANCIS E. REEFE.

REFERENCES CITED

The following references are of record in the file of this patent:

UNITED STATES PATENTS

| Number | Name | Date |
|---|---|---|
| 1,462,351 | Mechelsen | July 17, 1923 |
| 1,480,375 | Cristadoro | Jan. 8, 1924 |
| 1,696,878 | Bliss | Dec. 25, 1928 |
| 1,867,323 | Meyer | July 12, 1932 |
| 1,884,290 | Schults et al. | Oct. 25, 1932 |
| 2,170,377 | Nisle | Aug. 22, 1939 |
| 2,182,441 | Lee | Dec. 5, 1939 |